United States Patent [19]

Rotheiser

[11] 4,170,384

[45] Oct. 9, 1979

[54] MOLDED WHEEL HAVING A DECORATIVE SIDEWALL

[75] Inventor: Jordan I. Rotheiser, Highland Park, Ill.

[73] Assignee: American Wheel & Engineering Co., Inc., Arlington Heights, Ill.

[21] Appl. No.: 837,931

[22] Filed: Sep. 29, 1977

[51] Int. Cl.² ............................................. B60B 5/02
[52] U.S. Cl. ................................. 301/63 PW; 46/221
[58] Field of Search ............... 301/5 R, 7, 63 PW, 65, 301/63 R, 66, 95; 46/221; 74/230.5, 230.7; 16/45-46; 152/325-328, DIG. 12, 301

[56] References Cited

U.S. PATENT DOCUMENTS

| 3,360,300 | 12/1967 | Carter | 301/63 PW |
| 3,907,370 | 9/1975 | Bard | 301/63 PW X |

FOREIGN PATENT DOCUMENTS 628786 10/1961 Canada ............................. 301/63 PW 1180292 10/1964 Fed. Rep. of Germany ............ 46/221

Primary Examiner—Robert J. Spar
Assistant Examiner—Charles A. Marmor
Attorney, Agent, or Firm—Dressler, Goldsmith, Clement, Gordon & Shore, Ltd.

[57] ABSTRACT

A one-piece molded wheel which may be used on a wide variety of vehicles is disclosed. The wheel includes a generally annular tire portion integral with a central spoke portion and a hub portion. The generally annular tire portion has a U-shaped cross section with a pair of open edges which may receive a decorative annular band to give the tire portion the appearance of having a decorative side wall. The spoke portion comprises a plurality of spoke members which cooperate to define substantially U-shaped sections composed of planar members with each section oppositely oriented from each adjacent section. The configuration of the wheel makes it possible to manufacture it in a one-step molding operation.

17 Claims, 6 Drawing Figures

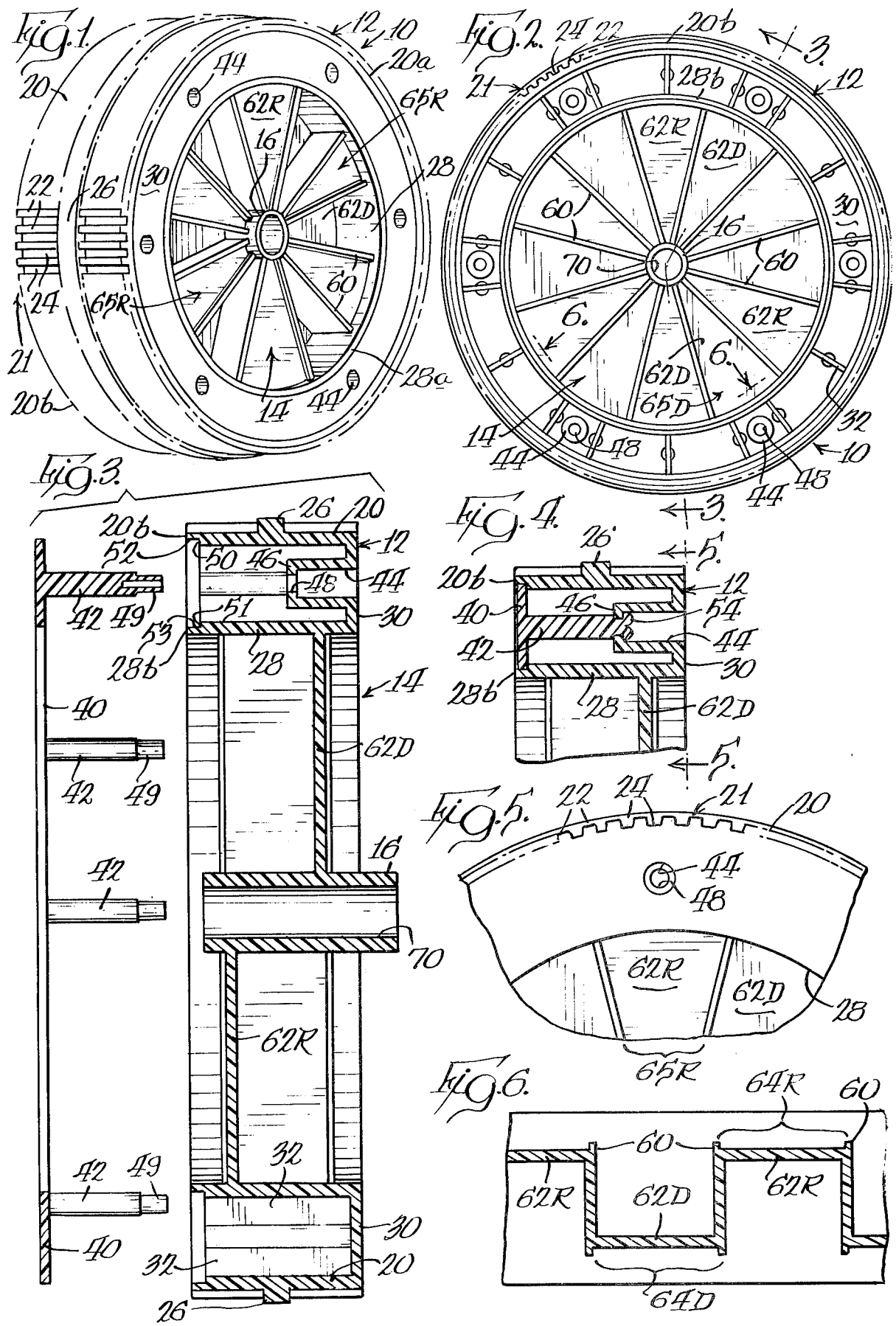

MOLDED WHEEL HAVING A DECORATIVE SIDEWALL

BACKGROUND OF THE INVENTION

This invention relates to a one-piece molded wheel which is useful on a wide variety of vehicles.

There is a need for relatively small wheels which can be cheaply manufactured and which have sufficient strength to effectly function over a long period of time for use in a number of applications, such as, e.g., a wide variety of small vehicles, such as lawn mowers, toys, and carts. Of the wheels which have previously been used, metal wheels are expensive to make, heavy, and require a tire around the outer periphery. On the other hand, many plastic wheels which have been previously available have had insufficient strength for most of the above-enumerated uses.

U.S. Pat. No. 3,604,756 to Gruber discloses a plastic wheel for domestic and industrial use in which a single molded member has a hub and a rim connected to the hub by an imperforate sinuous ribbon to provide radial support therefor. The wheel is designed to be used with an annular tire disposed on its rim. Thus, the Gruber patent basically discloses a two-piece wheel and tire combination which requires an assembly step before the combination is ready for use.

A number of other patents disclose combined wheel and tire combinations. For example, Belgium Pat. No. 642,417 discloses a wheel similar to that disclosed in the Gruber patent. U.S. Pat. No. Des. 192,417 to Hultersturn also discloses a combined wheel and tire having an essentially cross-shaped spoke arrangement supporting a rim which supports a tire. U.S. Pat. No. 2,684,099 to Henry discloses a tire and wheel combination in which the hub has axial dimensions greater than the axial dimensions of the tire, and the spokes comprise a continuous, corrugated sheet extending from the rim to the hub. U.S. Pat. No. 922,161 also discloses a one-piece wheel having a continuous sheet between its rim and its hub, wherein the sheet is corrugated on lines extending radially from the axis of the wheel and the corrugations are of gradually decreasing depth from the hub to the rim. Similar one-piece wheel arrangements are shown in Australian Pat. Nos. 247,211 to Thompson et al., and 240,075 to Thompson.

SUMMARY OF THE INVENTION

The present invention provides a one-piece molded wheel which is preferably made of plastic and which has an annular tire portion integral with the wheel so that when the wheel is taken out of its mold, it is essentially ready for use on a vehicle without additional manufacturing steps. The one-piece molded wheel of the present invention comprises a generally annular tire portion, a central spoke portion, and a hub portion. The generally annular tire portion comprises a radially outer generally cylindrical peripheral portion having tread means for engaging a surface upon which the wheel may be rolled, an intermediate annular portion disposed radially inwardly and generally transversely of the peripheral portion and integral therewith, and a radially inner generally cylindrical rim portion disposed radially inwardly of the intermediate portion and integral therewith. A plurality of support members are disposed between the peripheral portion and the rim portion, and each support member has one end integral with the peripheral portion and its other end integral with the rim portion. The central spoke portion comprises a plurality of spoke members. Each spoke member has one end integral with the rim portion to provide support therefor along the radial direction of the wheel with respect to its axis, and the other end of each spoke member is integral with the hub portion. The hub portion is substantially cylindrically shaped and defines an opening for receiving an axle of a wheel in rotatable relationship therewith.

In a preferred embodiment, each of the spoke members is generally planar and each spoke member is integral with and generally transverse to each adjacent spoke member, with the spoke members comprising a series of circumferentially spaced spoke ribs and spoke walls. Each of the spoke ribs lies in a plane passing through the axis of the wheel, and each of the spoke walls is triangularly shaped and is generally transverse to the spoke ribs. Moreover, each of the triangularly shaped spoke walls is axially offset from each adjacent spoke wall and disposed adjacent the edges of the spoke ribs to define substantially U-shaped sections composed of planar members, with each section oppositely oriented from each adjacent section. This configuration permits the wheel to be manufactured in one step by a molding process which is well known in the art, and thus provides a one-piece tire and wheel comination which can be made in a one-step manufacturing operation.

In a preferred embodiment, the one-piece molded wheel of the present invention may be further provided with a decorative annular band which may be disposed between its peripheral portion and its rim portion. For a black wheel, a white annular band may be provided to give the wheel the appearance of having a tire with a white sidewall, such as is commonly provided on automobile tires.

BRIEF DESCRIPTION OF THE DRAWINGS

FIG. 1 is a perspective view of one embodiment of a wheel of the present invention;

FIG. 2 is a side elevational view of the wheel of FIG. 1 showing the opposite side of the wheel;

FIG. 3 is an exploded cross-sectional view of the wheel shown in FIG. 2 taken through line 3—3 of FIG. 2;

FIG. 4 is a fragmentary sectional view of the annular tire portion of the wheel showing a combination of the wheel and an annular band disposed thereon;

FIG. 5 is an enlarged partial view of the wheel illustrated in FIG. 4 taken along line 5—5; and FIG. 6 is a cross-sectional view taken through lines 6—6 of FIG. 2.

DETAILED DESCRIPTION

In a preferred embodiment of the one-piece molded wheel of the present invention shown in FIG. 1, wheel 10 includes a generally annular tire portion 12, a central spoke portion 14, and a hub portion 16.

Generally annular tire portion 12 comprises a radially outer generally cylindrical peripheral portion 20 having tread means 21 for engaging a surface upon which the wheel is rolled. The tread means 21 comprises a plurality of axially oriented space-apart ribs 22 which define a plurality of axially oriented spaced-apart grooves 24. The peripheral portion also includes a circumferential band or projection 26 extending about the entire wheel and disposed on the circumference midline of peripheral portion 20. Circumferential projection 26 extends radially outwardly of peripheral portion 20 and provides a circumferentially oriented tread which minimizes the noise produced by the wheel.

Generally annular tire portion 12 further includes substantially cylindrical rim portion 28 disposed radially inwardly of peripheral portion 20. Preferably, rim portion 28 has axial dimensions substantially equal to the axial dimensions of peripheral portion 20, and both peripheral portion 20 and rim portion 28 are disposed generally symmetrically about the circumferential midplane of the wheel so that edges 20a and 28a of peripheral portion 20 and rim portion 28, respectively, are approximately equally axially spaced from the circumferential midplane of wheel 10.

Intermediate annular portion 30 is disposed between and integral with rim portion 28 and peripheral portion 20, and is preferably adjacent axially corresponding edges 20a and 28a to form a generally U-shaped section with peripheral portion 20 and rim portion 28 having open edges 20b and 28b opposite from edges 20a and 28a which are adjacent annular portion 30. Thus, the side of annular tire portion 12 shown in FIGS. 1 and 5 is closed, while the opposite side of annular tire portion 12 shown in FIG. 2 is open.

As is shown in FIG. 2, generally annular tire portion 12 further includes a plurality of support members 32 circumferentially spaced about annular tire portion 12. Each support member has one end integral with peripheral portion 20 and its other end integral with rim portion 28 to provide support for peripheral portion 20 in the radial direction. Preferably, support members 32 lie in a plane passing through the axis of the wheel, and are also integral with intermediate annular portion 30 to provide three dimensional structural support for the annular tire portion, and have axial dimensions less than the axial dimensions of rim portion 28.

In the illustrated embodiment, the wheel is provided with an annular band 40 having dimensions substantially corresponding to the open annular space between peripheral portion 20 and rim portion 28. The band 40 is located on the opposite side of the wheel from intermediate annular portion 30 and between open edges 20b and 28b to provide what appears to be a decorative sidewall. As is shown in FIG. 3, the annular band 40 includes a plurality of projections 42 which are insertable into a like number of receptacles 44 disposed on and integral with intermediate annular portion 28. Each receptacle 44 includes a flange portion 46 which defines an opening 48 for receiving projections 42 of annular band 40. Projections 42 may be hollow or split at their ends 49 so thay they may easily pass through openings 48 of receptacles 44 and be permanently affixed thereto, such as by staking or otherwise deforming the ends. The open edges 20b and 28b of peripheral portion 20 and rim portion 28 are notched to provide seat portions 50 and 51 for annular band 40 so that when annular band 40 is disposed between peripheral portion 20 and rim portion 28, it may rest snugly against seat portions 50 and 51 with the edges of annular band 40 fitting snugly within legs 52 and 53 of peripheral portion 20 and rim portion 28 respectively.

FIG. 4 shows a portion of annular band 40 disposed on annular tire portion 12 and in secured arrangement therewith. Projection 42 is secured to receptacle 44 by head portion 54 which has been formed by deforming ends 49 such as by staking or heating ends 49 of projections 42 past their softening point to cause the ends to partially melt. Head portion 54 lies against flange 46 of receptacles 44 to hold annular band 40 against seat portions 50 and 51. When annular band 40 is a different color than wheel 10, i.e., when annular band 40 is white and wheel 10 is black, it gives tire portion 12 the appearance of having a decorative sidewall such as a white sidewall. Thus, the side of the wheel upon which annular band 40 is disposed may be placed facing outwardly of a vehicle upon which wheel 10 is disposed to give the one-piece molded wheel a decorative appearance.

Annular tire portion 12 is integral with and is radially supported by central spoke portion 14. Central spoke portion 14 comprises a plurality of spoke members including spoke ribs 60 and spoke walls 62, each spoke member 60 and 62 being integral with rim portion 28 at one end and hub portion 16 at its other end. Each spoke rib 60 is substantially planar, circumferentially spaced about the wheel, and lies in an axially extending plane, and each of spoke ribs 60 is integral with two spoke walls 62R and 62D oriented generally transversely of the ribs. Each of the spoke ribs 60 has substantially constant axial dimensions over its entire length in the illustrated embodiment. Preferably, the width or axial dimension of each spoke rib 60 is less than the axial dimension of rim portion 28 and hub portion 16. Each spoke wall 62R and 62D is substantially triangularly shaped, and each spoke wall 62R is axially and circumferentially spaced from each adjacent spoke wall 62D so that spoke walls 62R and 62D and spoke ribs 60 define a plurality of substantially U-shaped sections 64R and 64D composed of planar members wherein each planar U-shaped section 64R is inversely oriented with respect to each adjacent planar U-shaped section 64D as is shown in FIG. 6. In a preferred embodiment, each of the triangularly shaped spoke walls 62R and 62D is disposed adjacent the outer edges 60a of an adjacent pair of ribs 60. Thus, as is shown in FIG. 1, the central spoke portion 14 of each side of wheel 10 appears to have six pie-shaped spokes where each pie-shaped spoke 65R is defined by raised spoke wall 62R and two adjacent spoke ribs 60 which define U-shaped sections 64R shown in FIG. 6, and each pie-shaped spoke is circumferentially separated by recessed spoke wall 62D. The pie-shaped spokes 65D which appear on the other side of the wheel, and which are shown in FIG. 2, are circumferentially offset from the pie-shaped spokes 65R on the opposite side by the circumferential dimension of spoke wall 62R. Thus, each pie-shaped spoke 65D on the side of wheel 10 illustrated in FIG. 2 is defined by spoke wall 62D and two adjacent spoke ribs 60 which define U-shaped sections 64D shown in FIG. 6.

Hub portion 16 is integral with one end of each of the spoke members and is of generally cylindrical shape in the illustrated embodiment. Hub portion 16 defines opening 70 which is of suitable size so that an axle may pass therethrough in rotatable arrangement with the wheel. If desired, hub portion 16 may be provided with bearings or the like on its inner surface for facilitating rotation on an axle of a vehicle.

The configuration of the one-piece wheel of the present invention permits the wheel to be manufactured by a molding process. Any of the molding processes which are known to those skilled in the art may be used to make the wheel of this invention.

The one-piece molded wheel of the present invention has sufficient strength for use on a wide variety of small vehicles such as lawn mowers, golf carts, outdoor grills, and the like. And, because it may be produced by any suitable molding process which is known in the art, it is possible to manufacture such wheels inexpensively and quickly.

Although this invention has been discussed and illustrated in terms of its preferred embodiments, such discussion and illustration is intended as being an exemplification of the principals of the invention, and not as a limitation thereof. The only limitations with respect to the present invention are set out in the appended claims.

I claim:

1. A one-piece molded wheel comprising:
   a generally annular tire portion, a central spoke portion, and a hub portion;
   said generally annular tire portion comprising a radially outer generally cylindrical peripheral portion having tread means extending outwardly thereof for engaging a surface upon which the wheel is rolled, a radially inner generally cylindrical rim portion disposed radially inwardly of the tire portion, and an intermediate annular portion disposed generally transversely of said peripheral and rim portions extending between corresponding axial edges thereof and formed integrally therewith, and a plurality of support members each having one end integral with said peripheral portion and its other end integral with said rim portion;
   said central spoke portion comprising a plurality of spoke members, each spoke member having one end integral with said rim portion of the annular tire portion and the other end integral with said hub portion to provide support therefor;
   said hub portion being substantially cylindrically shaped and defining an opening for receiving an axle of a vehicle in rotatable relationship therewith;
   an annular band disposed between corresponding axial edges of said rim and said peripheral portions opposite from said annular portion; and
   means forming part of said annular portion for securing said annular band thereto.

2. The one-piece molded wheel of claim 1 wherein said tread means comprises a plurality of axially oriented spaced-apart ribs.

3. The one-piece molded wheel of claim 2 wherein said generally axially oriented spaced-apart ribs define a plurality of spaced-apart grooves therebetween.

4. The one-piece molded wheel of claim 1 wherein said intermediate annular portion, said rim portion, and said peripheral portion define a substantially U-shaped section having open edges, said rim portion and said peripheral portion having substantially equal axial dimensions.

5. The one-piece molded wheel of claim 4 wherein said rim portion and said peripheral portion are oriented symmetrically about the circumferential midplane of the wheel.

6. The one-piece molded wheel of claim 4 wherein said support members are formed integrally with said intermediate annular portion, and have axial dimensions less than the axial dimensions of said rim portion.

7. The one-piece molded wheel of claim 4 wherein an annular band is disposed on the open edges of said substantially U-shaped section.

8. The one-piece molded wheel of claim 1 wherein said annular band has at least one visually observable characteristic which is different from said wheel.

9. The one-piece molded wheel of claim 8 wherein said at least one visually observable characteristic is color.

10. The one-piece molded wheel of claim 1 wherein each of said spoke members is generally planar, and each spoke member is integral with and generally transverse to each adjacent spoke member.

11. The one-piece molded wheel of claim 10 wherein said spoke members comprise a plurality of substantially planar circumferentially spaced spoke ribs, each of said spoke ribs lying in an axial plane and a plurality of circumferentially spaced spoke walls oriented substantially transverse to said spoke ribs, each adjacent pair of said spoke ribs integral with one of said spoke walls.

12. The one-piece molded wheel of claim 11 wherein each spoke wall is axially spaced from each adjacent spoke wall so that said spoke walls and spoke ribs define a plurality of substantially planar U-shaped sections, and each substantially planar U-shaped section is inversely oriented with respect to each adjacent substantially planar U-shaped section.

13. The one-piece molded wheel of claim 11 wherein each of said spoke walls has a generally triangularly shaped configuration.

14. The one-piece molded wheel of claim 11 wherein each spoke wall is disposed axially outwardly of the circumferential midplane of the wheel.

15. The one-piece molded wheel of claim 14 wherein each spoke wall is disposed on the axially opposite side of the circumferential midplane from each adjacent spoke wall.

16. The one-piece molded wheel of claim 15 wherein each spoke wall is disposed adjacent opposing edges of each spoke rib.

17. The one-piece molded wheel of claim 1 wherein:
    said securing means includes a plurality of axially extending receptacles extending axially inwardly from said annular portion and having an open end therein;
    said annular band including a plurality of projections receivable within said receptacles and fastenable thereto for retaining said band on said wheel.

* * * * *